Aug. 8, 1944.     C. PAULSON     2,355,555
TESTING FIXTURE
Filed April 24, 1943     2 Sheets-Sheet 1

INVENTOR.
C. PAULSON
BY
Harry L. Duff
ATTORNEY

Aug. 8, 1944.　　C. PAULSON　　2,355,555
TESTING FIXTURE
Filed April 24, 1943　　2 Sheets-Sheet 2
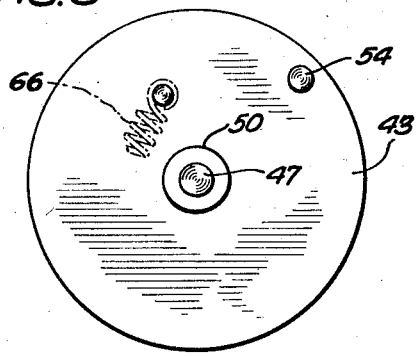
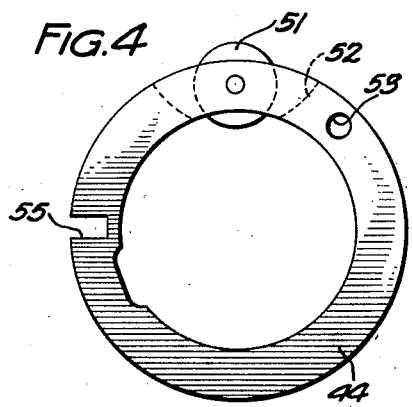
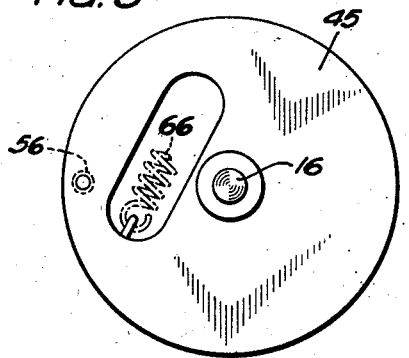
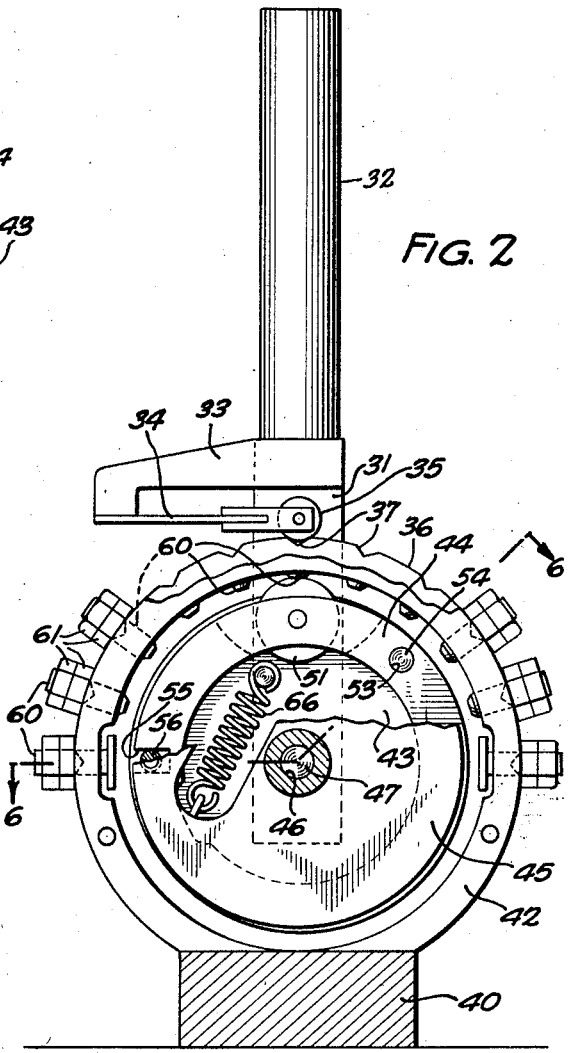
INVENTOR.
C. PAULSON
BY
ATTORNEY Patented Aug. 8, 1944

2,355,555

UNITED STATES PATENT OFFICE 2,355,555

TESTING FIXTURE

Christian Paulson, Elmhurst, Ill., assignor to Western Electric Company, Incorporated, New York, N. Y., a corporation of New York Application April 24, 1943, Serial No. 484,504

7 Claims. (Cl. 74—10)

This invention relates to testing fixtures and more particularly to a fixture for connecting a standard and test condenser during the adjustment of the test condenser.

It is an object of the present invention to provide a fixture for interconnecting two rotatable elements for variable rotation by a common actuator.

In accordance with one embodiment of the invention, a test fixture is provided for interconnecting a standard condenser with a condenser being compared with and adjusted to agree with the standard condenser, wherein a manually operable handle may be set to predetermined angular positions to move the condenser under test to corresponding positions while simultaneously imparting predetermined amounts of rotation to the standard condenser, which predetermined amounts may be more or less than the angles through which the handle is moved. In this apparatus, a series of interconnected discs, the intermediate one of which may be set to various eccentric positions by camming pins, serve to adjust the relative amount of rotation imparted to the two condensers.

Figure 1:
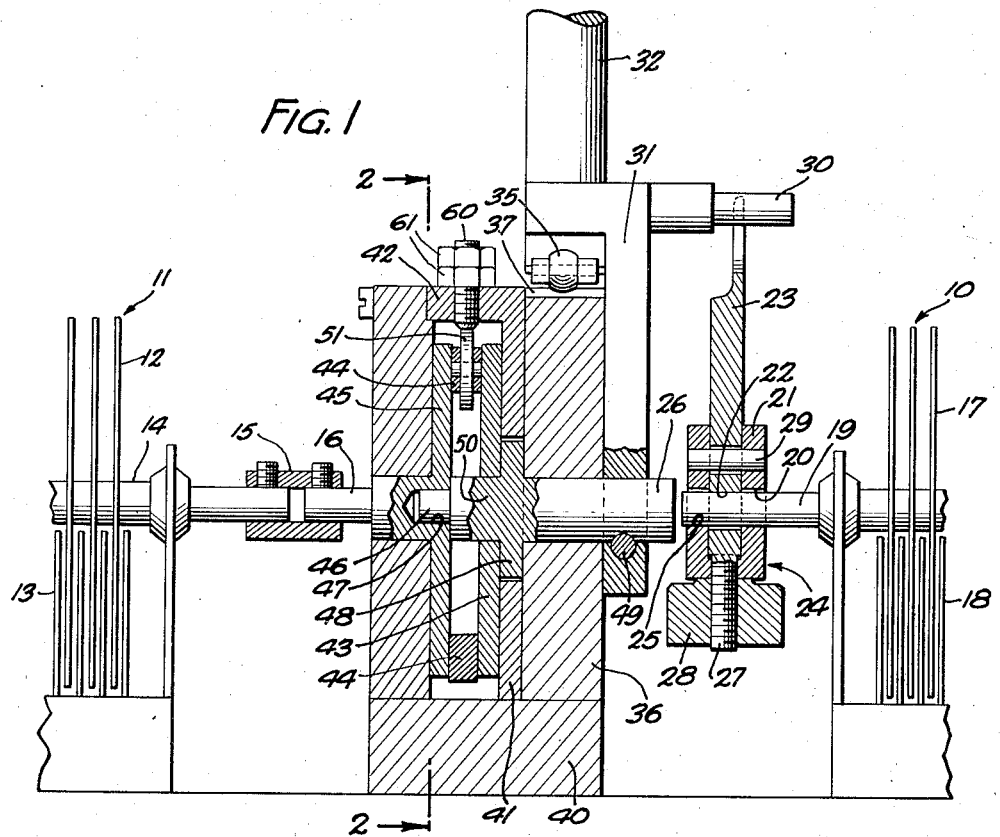
Figure 6:
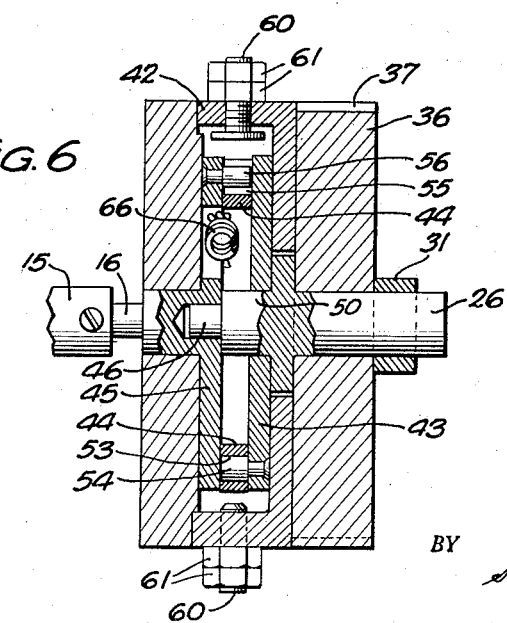

A better understanding of the invention may be had by reference to the following detailed description when considered in conjunction with the accompanying drawings, wherein Fig. 1 is a side elevational view, partly in section, of the apparatus showing the means for interconnecting the condenser to be tested and the standard condenser;

Fig. 2 is a sectional view taken along the line 2—2 of Fig. 1 in the direction of the arrows;

Figs. 3, 4 and 5 are face views of the disc details which are utilized in achieving the variable drive of the standard condenser; and Fig. 6 is an irregular sectional view taken substantially along the line 6—6 of Fig. 2 in the direction of the arrows showing the relative position of the discs shown in detail in Figs. 3, 4 and 5.

Referring to the drawings, wherein like reference characters designate the same parts in the several views, a condenser 10 to be adjusted is interconnected with a standard condenser 11, which has been constructed to have a predetermined capacity at predetermined points of the rotation of its movable plates 12 with respect to its fixed plates 13. In the apparatus, the movable plates 12 of the standard condenser are mounted upon a shaft 14, which is connected to the variable drive through a sleeve 15 fixed to the shaft 14 and to a stud shaft 16 of the drive mechanism. The condenser 10 being adjusted comprises movable plates 17 and fixed plates 18, the movable plates being fixed to a rotatable shaft 19.

When a condenser 10 is to be adjusted by bending its plates to move them closer to or farther away from their associated plates, the shaft 19 of the condenser to be tested is inserted through an aperture 20 in a plate 21, which aperture 20 is normally in alignment with an aperture 22 in a lever 23. The plate 21 forms a part of the U-shaped member 24, which has an aperture 25 in its lefthand plate member also for receiving the end of the shaft 19. The aperture 22 is formed in the end of a threaded member 27 which is threadedly engaged by a thumb nut 28 and which extends into the space between the plates of the U-shaped member 24 and constitutes an extension of the lever 23. A pin 29 is provided for normally holding the U-shaped member 24 on the end of the lever 23.

From the foregoing, it is believed to be apparent that after the shaft 19 of the condenser to be tested is inserted through the aligned apertures 20, 22 and 25, the thumb nut 28 may be adjusted to cause the inner walls of the aperture 20 and apertures 22 and 25 to cooperate in gripping the shaft 19. The upper end of the lever 23 is bifurcated to engage an actuator stud 30 extending to the right (Fig. 1) from an actuating lever 31 adapted to be actuated by handle 32. The handle 32, as seen most clearly in Fig. 2, has a spring supporting bracket 33 fixed to it which carries a center stop spring 34, on the right end of which there is provided a center stop roller 35. The center stop roller 35 rides on the periphery of a block 36, which has a series of notches 37 formed in its periphery for engagement by the center stop roller 35. These notches are very accurately cut in the periphery of the block 36 and are positioned in accordance with the various positions at which the condenser 10 would be adjusted to have a predetermined capacity.

The purpose of the apparatus is to rotate the standard condenser 11 through a smaller or greater arc than the condenser 10, since it has proven undesirable to bend or otherwise deform the plates of the condenser 11 to adjust it to the proper capacity and while such practice is satisfactory in the condenser being tested, the standard condenser should not be so adjusted but should be made, as accurately as possible, to have the desired capacity when set at the various positions under control of the handle 32, whereas the condenser 10 under test will be adjusted to have the same capacity as the condenser 11 when the condenser 10 is set in the positions under control of the notches 37 and center stop roller 35.

The block 36 having the notches 37 in its periphery is mounted on a base member 40, which has suitably fixed to it, in addition to the block 36, a partially circular member 41 having a shoulder 42 extending circumferentially of it in alignment with the circumference of the block 36. Within the pocket formed by the flat upper surface of the block 40 and the shoulder 42, there are mounted three discs 43, 44 and 45. The disc 45 has the stud shaft 16 formed integrally with it and is provided with a socket 47, into which the reduced left end 46 of the shaft 26 extends so that the disc 45 is supported for rotation on the end of the shaft 26. The shaft 26 is provided with an annular shoulder 48, which engages the left face of the block 36 and cooperates with the lever 31, which is keyed to the shaft 26 at 49 to hold the shaft 26 in place on the block 36. The disc 43 is also supported upon the shaft 26, being suitably shrunk onto a portion 50 of the shaft 26. Interposed between the discs 43 and 45 is the disc 44, which is annular in configuration and carries a roller 51 freely rotatable in a slot 52 formed therein. The annular disc 44 is provided with an aperture 53 adapted to receive a pin 54 on the disc 43 so that the disc 44 will be driven by the disc 43 when the disc 43 is rotated by manipulating the handle 32. The disc 44 is also provided with a slot 55, into which extends a pin 56 secured to the disc 45. Thus, the rotation of disc 43, by manipulating the handle 32, will transmit motion through the disc 44 to the disc 45 since the disc 45 is attached to the disc 43 by a coil spring 66 and normally tends to move the disc 45 through the same angular distance as the disc 43. However, since the annular disc 44 forms a floating connection between the discs 43 and 45, the amount that the spring 66 is permitted to move the disc 45 with the disc 43 will be controlled by the displacement of the annular disc 44.

The shoulder 42 of the partially circular member 41 has a plurality of set screws 60 threaded into it about its periphery and locked in adjusted position by lock nut assemblies 61. The amount that the screws 60 are adjusted inwardly or outwardly with respect to the shoulder 42 will determine the radial position of the roller 51. Since the discs 43 and 45 are urged to rotate together due to the spring 66 which interconnects them resiliently, they will also tend to force the roller 51 outwardly against the various screws 60. Accordingly, the positive connection between the discs 43 and 45 through the disc 44 will be varied as the disc 44 is displaced to eccentric position with respect to the shaft 19. When the disc 44 is displaced eccentrically of the shaft 19, either by the spring 66 forcing it to move outwardly or by one of the screws 60 forcing it to move inwardly, additional rotation will be imparted to the disc 45 in one direction or another, depending upon whether the roller 51 moves outwardly or inwardly.

Thus, in the apparatus described hereinbefore, the screws 60 may be adjusted in such a manner that at various positions, determined by the center stop roller 35 registering with notches 37, the shaft 14 of the condenser 11 will be rotated through a number of degrees of rotation different from the number of degrees of rotation imparted to the shaft 19. In this manner, the condenser 11 may be adjusted by rotating it to have the desired capacity at the selected positions of the handle 32 (not necessarily the same rotative positions as condenser 11) and the condenser 10 may be compared with the condenser 11 through any suitable comparing device while the plates of the condenser 10 are being adjusted.

What is claimed is:

1. In an adjusting fixture, a pair of driven shafts, a common actuator for said shafts, means positively connecting one driven shaft to the actuator for rotation thereby, and a variable connection between the actuator and the other shaft including means positively connected to the positively driven shaft, a pin mounted eccentrically of the shaft on the means positively connected to the driven shaft, a connector driven by said pin and connected to the said other shaft, and means for controlling the degree of eccentricity of movement of said connector to control its effect as a connector.

2. A coupling for electrical devices having rotational movement comprising means for rotating one of said devices in equal increments, means for rotating the other of said devices in predetermined selected increments including a coupling element, means for urging said element to assume a predetermined amount of eccentricity with respect to the axis of rotation of said devices, means settable to control the degree of eccentricity of said coupling element, and means common to both of said means for rotating the devices for actuating them.

3. A coupling for electrical devices having rotational movement comprising a rotatable shaft, means for connecting said shaft to one of said devices, a disc driven by said shaft, a pivot stud fixed to said disc, a ring pivoted on said stud, an actuator stud mounted on said ring, a second disc positively connected to said other device and having surfaces engaging the actuator stud on the ring, resilient means for urging the discs to rotate with respect one to another to move said ring to a predetermined position with respect to said discs, and means settable to control the movement of the ring by the urging means.

4. In a coupling for electrical devices having rotational movement, a pair of driven discs, an actuator connected to one of said discs for rotating it through an angle equal to the angular displacement of the actuator, a ring coupling member pivoted eccentrically of said one disc and having a radial camming surface thereon, a camming pin fixed eccentrically of said second disc for engaging said camming surface, means for urging said discs to rotate with respect one to another, and means for guiding said ring to control the relative rotation of said discs.

5. In a coupling for electrical devices having rotational movement, a pair of discs separately connected to said devices, resilient means for urging said discs to rotate one with respect to the other, means connected to said discs and displaceable by movement between said discs, and means for limiting the displacement of said means connected to both discs.

6. In a coupling for electrical devices having rotational movement, a pair of discs separately connected to said devices, resilient means for urging said discs to rotate one with respect to the other, means connected to said discs and displaceable by movement between said discs, and an adjustable means for determining the amount of displacement of the means connected to the discs to control the relative movement between the discs.

7. In a coupling for electrical devices having rotational movement, a pair of discs separately connected to said devices, resilient means for urging said discs to rotate one with respect to the other, means connected to said discs and displaceable by movement between said discs, means for limiting the displacement of said means connected to both discs, and means for moving one of said discs to impart movement to it and to the means interconnecting the discs.

CHRISTIAN PAULSON.